July 2, 1940.   J. F. NEUMUELLER ET AL   2,206,303
EYE TESTING DEVICE
Filed Aug. 19, 1936
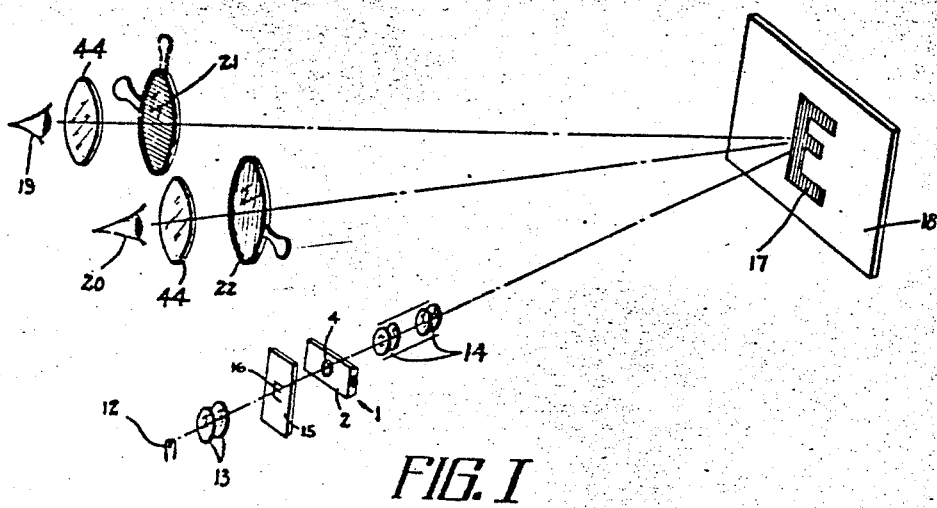
FIG. I
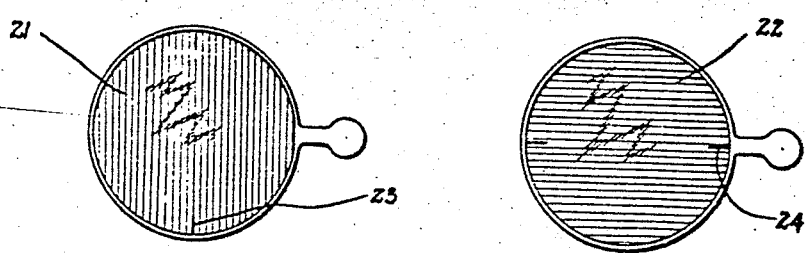
FIG. II
FIG. III
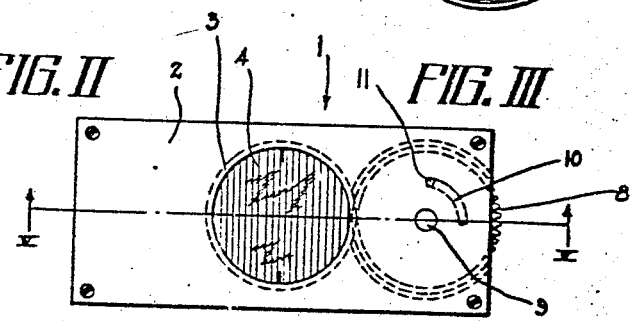
FIG. IV
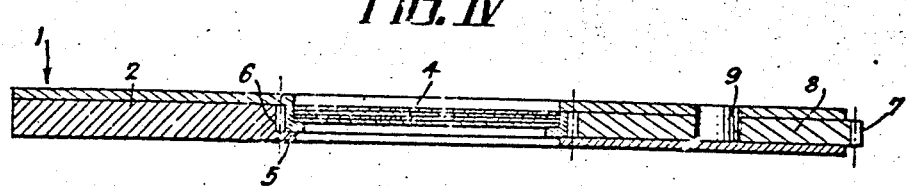
FIG. V
INVENTORS
JULIUS F. NEUMUELLER
JAMES Y. TAYLOR
BY
Harry H. Stull
ATTORNEY Patented July 2, 1940

2,206,303

UNITED STATES PATENT OFFICE 2,206,303

EYE TESTING DEVICE

Julius F. Neumueller, Quinebaug, Conn., and James Y. Taylor, Southbridge, Mass., assignors to American Optical Company, Southbridge, Mass., a voluntary association of Massachusetts Application August 19, 1936, Serial No. 96,826

2 Claims. (Cl. 88—20)

This invention relates to improved means and method of testing eyes.

One of the principal objects of the invention is to provide novel means and method of testing sight, especially where malingering is suspected.

Another object is to provide means at a suitable distance from the eyes which may be rendered visible to one or the other of the eyes separately, or to both eyes simultaneously.

Another object is to provide novel means and method of shifting the visual stimulus from one eye to the other without the knowledge of the subject.

Another object is to provide a projector having means associated therewith for projecting an image by means of light rays polarized in a given plane, and to provide means adapted to be associated with the eyes, one of which is polarized in the same plane as the projected image and will permit vision of the test means, and the other polarized in a plane substantially normal to the first means and which will render the test means invisible to said eye.

Another object of the invention is to provide an attachment which may be utilized with standard projectors of the type now in commercial use.

Another object of the invention is to provide a smooth image receiving screen within the field of vision of the subject upon which the test image may be projected so that the polarized light utilized in producing the test image will not become depolarized.

Other objects and advantages of the invention will become apparent from the following description taken in connection with the accompanying drawing and it will be understood that many changes may be made in the arrangement of parts, details of construction and method shown and described without departing from the spirit of the invention as set forth in the accompanying claims. We, therefore, do not wish to be limited to the exact arrangement of parts, details of construction, and method shown and described as the preferred form only has been shown by way of illustration.

Referring to the drawing:

Fig. I is a diagrammatic perspective view illustrating the means and method of performing the test;

Figs. II and III are face views of the polarizing means or disks adapted to be placed before the eyes of the subject during the test;

Fig. IV is a face view of the attachment adapted to be utilized with the projector to polarize the light utilized in producing the test image;

Fig. V is a sectional view taken on line V—V of Fig. IV looking in the direction indicated by the arrows.

The device embodying the invention is adapted particularly for use in testing the eyes of individuals suspected of malingering or pretending blindness or partial blindness of one or the other of the eyes, as for instance in cases of individuals claiming compensation for accidents, exemption from military service, etc., or in any instance where the replies of the subject as to his vision cannot be relied upon.

It is therefore essential that such tests be made by means or methods whereby the visual acuity of each respective eye of the subject may be separately determined without direct knowledge on the part of the subject as to which eye is being tested.

Several devices have been utilized in the past for accomplishing this result but such devices have not been wholly practical because it has been difficult to keep the subject from knowing which eye was being tested. It is, therefore, one of the primary objects of this invention to overcome the difficulties of the prior art and to provide means whereby the eyes of individuals may be tested separately or simultaneously without knowledge on the part of the subject as to which of the eyes is seeing or if both eyes are seeing.

Referring more particularly to the drawing wherein like characters of reference designate like parts throughout the several views, the device embodying the invention comprises, as shown in Figs. I, IV and V, a polarizing unit 1 in the form of a slide member 2 having an opening 3 therein in which is mounted a disk of polarizing material 4. The polarizing material 4 is mounted in a ring member 5 having its periphery formed with gear teeth 6 which are adapted to mesh with the gear teeth 7 of a finger wheel 8, by means of which the disk 4 may be rotated to alter the axis of the polarizing material. The finger wheel 8 is pivotally attached at 9 within the slide 2 and is provided with a curved slot 10 through which a stop pin 11 mounted in the slide 2 extends to keep the rotary movement of the finger wheel 8 within the desired limits.

The polarizing unit 1 is adapted to be mounted within a suitable support in a projecting apparatus which, as shown diagrammatically in Fig. I, comprises a source of illumination 12, condensing lenses 13, and projection lenses 14 of the usual type. The projector is provided with the usual slide 15 bearing the means 16 for producing the projected test image 17. This projected image is focused on a suitable receiving screen 18 supported within the direct field of vision of the eyes 19 and 20 of the subject being examined or tested.

Suitable polarizing disks 21 and 22 are placed before the eyes of the subject. These polarizing disks are adapted to be supported by a trial frame or other means known in the art.

The polarizing disk 22 positioned before the eye 20 has its axis of polarization extending vertically, while the polarizing disk 21 before the eye 19 has its polarizing axis extending horizontally.

It is to be understood that if desired the axes of the disks 21 and 22 may be shifted, care being taken that the respective axes are at ninety degrees or perpendicular to each other.

Referring more particularly to Fig. I, it will be noted that the axis of polarization of the disk 4, which controls the polarization of the projected image 17, extends vertically, and in this particular instance the image would be visible only to the eye 20 because the axis of polarization of the disk 22 before the eye 20 is parallel to the axis of the reflected light of the projected image, the axis of polarization of the disk 21 being substantially normal to the reflected plane of the test image 17 and rendering said image invisible to the eye 19. To bring about a reverse condition, wherein the image 17 will be visible only to the eye 19, the finger wheel 8 is rotated until the axis of polarization of the light producing the image 17 is substantially parallel with the axis of the polarization of the disk 21 before the eye 19. At the same time this movement causes the axis of polarization producing the image 17 to lie in a plane substantially normal to the axis of the polarizing means 22 before the other eye. Thus the visibility of the image 17 will be shifted from one eye to the other. This shift will take place without the knowledge of the subject and without in any way disturbing him.

The test image 17 may be rendered visible to both eyes simultaneously by rotating the axis of polarization of the disk 4 to an axis of about forty-five degrees, which will permit enough light to pass through the polarizing disks 21 and 22 to enable the subject to see the test image 17 with both eyes.

The axes of polarization of the disks 21 and 22 are indicated by suitable markings 23 and 24 placed on the disks.

Instead of utilizing a single test member 17, it is to be understood that suitable reading matter may be projected or imaged on the receiving screen 18. In this instance the subject under test would be asked to read the projected matter and during the reading the operator may shift the axis of polarization of the disk 4 so as to change the visibility of the reading matter from one eye to the other. This change is imperceptible to the subject, and in this way an accurate test of the eyes may be obtained. If there is no hesitation on the part of the subject in reading when this shift, or change of polarization, takes place the operator will know that the subject is seeing with both eyes as otherwise he could not continue to read.

This shifting of the polarization of the projected test means is brought about by the mere turning of the finger wheel 8, and can be accomplished by the operator without altering any of the test means.

The visual acuity of the eyes under test may be corrected by correction lenses 44, such as commonly used in the art, until the best visual acuity is attained.

The polarizing means referred to throughout the specification as being formed of sheet material having a plurality of minute crystals oriented therein, is preferably formed of a transparent supporting medium in which the crystals are placed when the medium is in plastic or liquid state. The crystals are oriented and are held in said oriented relation until the material hardens. During the orienting of the crystals, the material is made into sheet form and is allowed to harden in this form and may thereafter be cut into the size and shape desired.

From the foregoing description it will be seen that simple, efficient and economical means and method have been provided for accomplishing all the objects and advantages of the invention, particularly that of producing malingering test means which may be quickly and easily manipulated.

Having described our invention we claim:

1. Eye testing apparatus for testing the eyes of an individual comprising the combination of a viewing screen positioned within the field of vision of the eyes under test, light projection means for projecting a beam of light on said viewing screen, a slide having image forming means thereon in said projection means with the image forming means in alignment with the projected beam of light for producing a single test image on said viewing screen, light polarizing means rotatably supported in the path of the projected light of said projection means movable to a position for polarizing the light producing the test image in a given direction, and movable to a second position for polarizing the light producing the test image in a direction substantially normal to the first direction while continuously projecting said image, polarizing means positioned before each of the respective eyes through which the light rays from the projected test image must pass so as to be visible to the respective eyes, one of said polarizing means having its axis of polarization positioned substantially parallel with the axis of polarization of the light producing the test image when the polarized light producing said image is in one position of adjustment and the other of said polarizing means having its axis of polarization positioned in a direction substantially normal to the axis of polarization of the polarizing means before the first eye, and substantially parallel with the axis of the polarized light producing the test image when in said second position of adjustment, and means for shifting the axis of polarization of the light producing the test image from an initial position substantially parallel with the axis of polarization of the polarizing means before one eye to a position substantially parallel with the axis of polarization of the polarizing means before the other eye whereby vision of said test image may be gradually shifted from one eye to the other with the individual under test having no direct knowledge of said shifting.

2. The method of testing the eyes of an individual comprising projecting a beam of light on a viewing screen positioned within the field of vision of the eyes under test, placing a slide having image forming means thereon in said projection means with the image forming means in alignment with the projected beam of light for producing a single test image on said viewing screen, rotatably supporting light polarizing means in the path of the projected light for polarizing the light producing the test image in a given direction, rotating said polarizing means to a second position for polarizing the light producing the test image in a direction substantially normal to the first while continually projecting said image, positioning polarizing means before each of the respective eyes through which the light rays from the projected test image must pass so as to be visible to the respective eyes and controlling the position of the axes of polarization of said polarizing means so that the axis of one of said polarizing means will be located substantially parallel with the axis of polarization of the light producing the test image when the polarized light producing said image is in one position of adjustment and so that the other of said polarizing means will have its axis of polarization positioned in a direction substantialy normal to the axis of polarization of the polarizing means before the first eye and substantially parallel with the axis of the polarized light producing the test image when in said second position of adjustment and shifting the axis of polarization of the light producing the test image from an initial position substantially parallel with the axis of polarization of the polarizing means before one eye to a position substantialy parallel with the axis of polarization of the polarizing means before the other eye whereby vision of said test image may be gradually shifted from one eye to the other with the individual under test having no direct knowledge of said shifting.

JULIUS F. NEUMUELLER.
JAMES Y. TAYLOR.